United States Patent [19]

Steckel et al.

[11] Patent Number: 5,620,292
[45] Date of Patent: Apr. 15, 1997

[54] APPARATUS FOR UNLOADING LARGE FISH FROM A BOAT HOLD

[75] Inventors: Horst Steckel; Helmut Kern, both of St. Ingbert, Germany

[73] Assignee: PWH Anlagen + Systeme GmbH, St. Ingbert, Germany

[21] Appl. No.: 588,627

[22] Filed: Jan. 11, 1996

[30] Foreign Application Priority Data

Jan. 26, 1995 [DE] Germany ............... 195 02 279.3

[51] Int. Cl.⁶ ................................................. B65G 67/60
[52] U.S. Cl. ........................................ 414/140.8; 198/713
[58] Field of Search .................................. 198/519, 711, 198/713; 414/140.8, 140.9, 141.1, 141.2

[56] References Cited

U.S. PATENT DOCUMENTS

| | | | |
|---|---|---|---|
| 742,023 | 10/1903 | Harris | 414/140.8 X |
| 1,322,647 | 11/1919 | Streich | 198/711 X |
| 1,478,812 | 12/1923 | Barene | |
| 1,666,995 | 4/1928 | Davis | |
| 4,585,384 | 4/1986 | Richard et al. | 414/141.1 |
| 5,320,471 | 6/1994 | Grathoff | 414/140.9 |

FOREIGN PATENT DOCUMENTS

| | | |
|---|---|---|
| 0549819 | 11/1994 | European Pat. Off. |
| 2306024 | 8/1973 | Germany |
| 3608116 | 5/1987 | Germany |
| 4121996 | 1/1993 | Germany ............... 414/140.9 |
| 84815 | 4/1957 | Netherlands ............ 414/141.1 |

Primary Examiner—Karen B. Merritt
Assistant Examiner—Janice L. Krizek
Attorney, Agent, or Firm—Herbert Dubno; Andrew Wilford

[57] ABSTRACT

An apparatus for unloading fish from a hold of a boat adjacent an unloading site has a carriage movable horizontally at the site along the boat, an articulated arm, and an endless conveyor extending along the arm. This arm has a rigid inner section having an inner end pivoted about a horizontal inner axis on the carriage and an outer end, a pivot defining an outer horizontal axis at the inner-section outer end, and a rigid outer section having an inner end pivoted on the inner-section outer end at the pivot and an outer end. An inner actuator braced between the carriage and the inner section can pivot the arm on the carriage about the inner axis and an outer actuator braced between the arm sections can pivot the outer section about the outer axis on the inner section. The conveyor extends along the arm from the inner-section inner end to the outer-section outer end and has a carry stretch on one side of the sections and a return stretch on an opposite side of the sections. A multiplicity of holders spaced along the conveyor each include a pair of separate laterally spaced buckets defining a central gap. Support wheels on the arm engage the belt in the gap between the buckets.

11 Claims, 2 Drawing Sheets

APPARATUS FOR UNLOADING LARGE FISH FROM A BOAT HOLD

FIELD OF THE INVENTION

The present invention relates to the unloading of cargo from a boat hold. More particularly this invention concerns an apparatus for unloading large fish from a boat hold.

BACKGROUND OF THE INVENTION

The unloading of large fish, e.g. tuna, from a fishing vessel that has returned to port is a difficult operation that must be carried out as quickly as possible, to decrease dock time and ensure that the fish remain fresh, while treating the fish themselves as gently as possible so they are not spoiled for subsequent use. The classic system is shown in EP 0,549,819 of Valsecchi which requires that the fish be individually attached to grippers or cables that are then lifted up group-wise out of the hold. Such an intermittent procedure entails substantial lost time while requiring loaders to expertly hook up the fish. If a fish is not properly attached it will drop off, getting lost or fouling the mechanism of the conveyor.

U.S. Pat. No. 1,666,995 of Davis proposes an L-shaped conveyor with a vertical depending arm that guides a sling-type conveyor. Fruit can be loaded manually into the slings at the lower end of the depending arm for relatively gentle treatment as it is conveyed first vertically up and then horizontally off to the wharf. Such a system has the disadvantage that it cannot reach into corners of the hold so that the fruit must be brought to the center of the hold for loading. In addition the conveyor is not good for use with fish, as it would quickly foul.

German 2,306,024 assigned to Creusot-Loire describes a rigid one-piece conveyor arm shaped like a somewhat flattened L that can reach into the corners of a hold remote from the wharf, but that cannot get even close to the corners closer to the wharf. U.S. Pat. No. 1,478,812 of Barene and German patent 3,608,116 of Kostrewa show bucket-type coal conveyors that either are L-shaped and rigid or that have a depending arm that is always vertical. These systems are not adapted for use with fish and, once again, cannot get into all the various corners of the hold.

OBJECTS OF THE INVENTION

It is therefore an object of the present invention to provide an improved apparatus for unloading fish from a boat hold.

Another object is the provision of such an improved apparatus for unloading fish from a boat hold which overcomes the above-given disadvantages, that is which can get into every corner of the hold and that is particularly well suited for the handling and conveying of large fish.

SUMMARY OF THE INVENTION

An apparatus for unloading fish from a hold of a boat adjacent an unloading site has according to the invention a carriage movable horizontally at the site along the boat, an articulated arm, and an endless conveyor extending along the arm. This arm has a rigid inner section having an inner end pivoted about a horizontal inner axis on the carriage and an outer end, a pivot defining an outer horizontal axis at the inner-section outer end, and a rigid outer section having an inner end pivoted on the inner-section outer end at the pivot and an outer end. An inner actuator braced between the carriage and the inner section can pivot the arm on the carriage about the inner axis and an outer actuator braced between the arm sections can pivot the outer section about the outer axis on the inner section. The conveyor extends along the arm from the inner-section inner end to the outer-section outer end and has a carry stretch on one side of the sections and a return stretch on an opposite side of the sections. A multiplicity of holders spaced along the conveyor element each include a pair of separate laterally spaced buckets defining a central gap. Support wheels on the arm engage the belt in the gap between the buckets.

Thus with this system the outer end of the outer arm section can be maneuvered into every corner of the hold. The outer section is not limited to a particular orientation to the inner section or a vertical position as in the prior art.

According to a further feature of the invention the sections are of generally the same length so that the pivot is central in the arm. This gives the system the ability to reach anywhere in the hold.

The actuators in accordance with this invention are hydraulic cylinders. The means for pivoting the arm about the inner axis includes a knee lever having an outer link with an outer end pivoted on the inner section adjacent its outer end and an inner end, and an inner link having an inner end pivoted on the carriage and an outer end pivoted on the outer-link inner end. The actuator is braced between the carriage and the inner link intermediate the inner-link ends. Such a system is very compact and keeps the inner actuator well out of the way.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
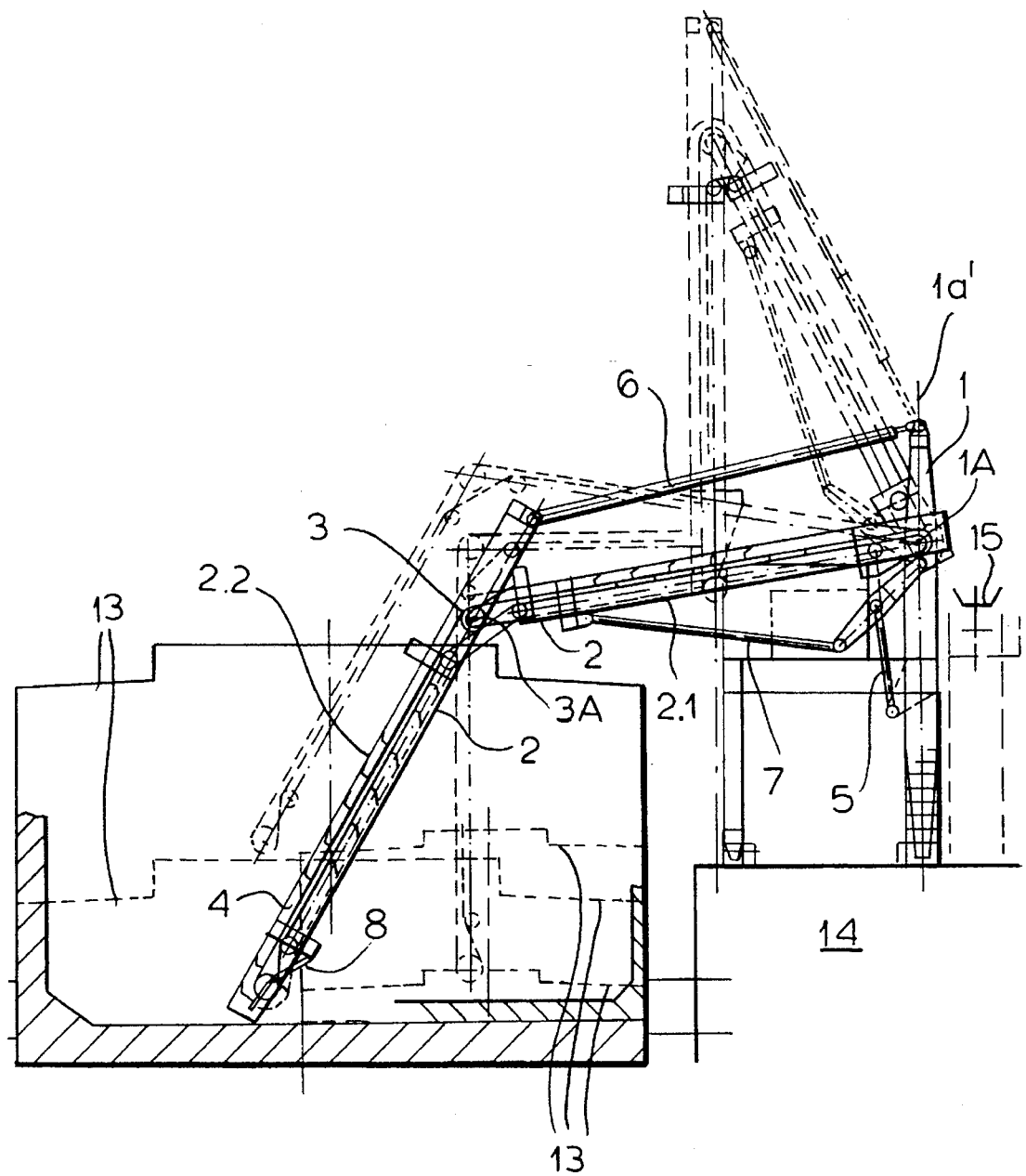
FIG. 1 is a small-scale and partly diagrammatic side view of the apparatus according to the invention.

As seen in FIG. 1 a carriage or portal 1 can travel along a wharf 14 in a horizontal direction perpendicular to the view plane. The portal 1 carries an articulated arm 2 comprising a rigid inner arm section 2.1 having an inner end pivoted about a horizontal axis 1A and a vertical axis 1a' on the portal 1 and an outer end on which a rigid outer arm section 2.2 is pivoted at a joint 3 about a horizontal axis 3A, both sections 2.1 and 2.2 being of about the same length. An inner double-acting hydraulic cylinder 5 is braced between the portal 1 and a two-link knee lever 7 is connected to the portal 1 and to the inner arm section 2.1 to control pivoting of the arm 2 about the axis 1A, and another actuator 6 braced between the arm sections 2.1 and 2.2 can control pivoting of the outer arm section 2.2 about the axis 3A.

Figure 2:
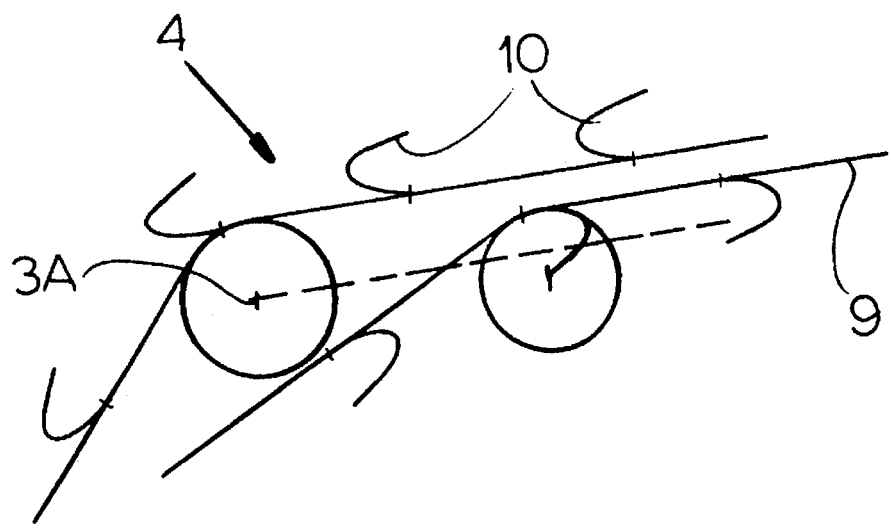
FIG. 2 is a larger-scale view of a detail of FIG. 1.
Figure 3:
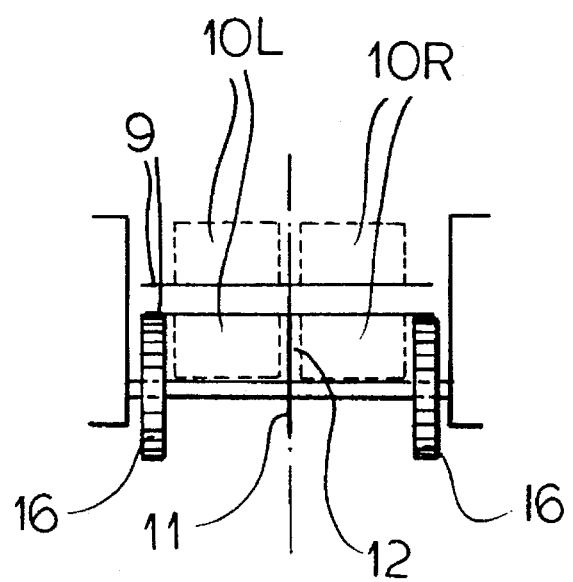
FIG. 3 is a cross-section through the conveyor of the apparatus.

A conveyor 4 extends the full length of the arm 2, from the outer end of the outer section 2.2 deep in the hold of the ship 13 (of which several are shown in dashed lines) to the inner end of the inner section 2.1 at a wharf-side conveyor 15 extending parallel to the travel direction of the portal 1. The conveyor as better shown in FIGS. 2 and 3 comprises an endless flat elastomeric belt 9 of rubber or plastic and provided with a row of uniformly spaced holders 10 each constituted by a right-hand U-shaped bucket 10R and a left-hand U-shaped bucket 10L separated by a central gap 12. The belt 9 rides on a central support/guide wheel 11 engaging in the gap 12 and outer support/guide wheels 16 flanking the holders 10. The outer end of the outer section 4 is provided with a hydraulic belt tensioner 8.

In the carry stretch, that is that half of the conveyor 4 on the outer side of the arm section 2.2 and upper side of the arm section 2.1, the center wheels 11 engage the back side of the belt 9 so that fish can be laid in the holders crosswise, extending from one U-section bucket 10L to the adjacent bucket 10R. In the return stretch the wheel 11 engages between these buckets 10L and 10R, but since they are empty this does not create a problem.

We claim:

1. An apparatus for unloading fish from a hold of a boat adjacent an unloading site, the apparatus comprising:

a carriage movable horizontally at the site along the boat;

an articulated arm having a rigid inner section having an inner end pivoted about a horizontal inner axis on the carriage and an outer end, a pivot defining an outer horizontal axis at the inner-section outer end, and a rigid outer section having an inner end pivoted on the inner-section outer end at the pivot and an outer end;

means including an inner actuator braced between the carriage and the inner section for pivoting the arm on the carriage about the inner axis;

means including an outer actuator braced between the carriage and the outer arm section for pivoting the outer section about the outer axis on the inner section;

an endless conveyor element extending along the arm from the inner-section inner end to the outer-section outer end; and a multiplicity of holders spaced along the conveyor element.

2. The fish-unloading apparatus defined in claim 1 wherein the sections are of generally the same length, whereby the pivot is central in the arm.

3. The fish-unloading apparatus defined in claim 1 wherein the actuators are hydraulic cylinders.

4. An apparatus for unloading fish from a hold of a boat adjacent an unloading site, the apparatus comprising:

a carriage movable horizontally at the site along the boat;

an articulated arm having a rigid inner section having an inner end pivoted about a horizontal inner axis on the carriage and an outer end, a pivot defining an outer horizontal axis at the inner-section outer end, and a rigid outer section having an inner end pivoted on the inner-section outer end at the pivot and an outer end;

means including an inner actuator braced between the carriage and the inner section and a knee lever having an outer link with an outer end pivoted on the inner section adjacent its outer end and an inner end, and an inner link having an inner end pivoted on the carriage and an outer end pivoted on the outer-link inner end for pivoting the arm on the carriage about the inner axis, the inner actuator being braced between the carriage and the inner link intermediate the inner-link ends;

means including an outer actuator braced between the carriage and the outer arm section for pivoting the outer section about the outer axis on the inner section;

an endless conveyor element extending along the arm from the inner-section inner end to the outer-section outer end; and a multiplicity of holders spaced along the conveyor element.

5. The fish-unloading apparatus defined in claim 4, further comprising a tightener on the outer-section outer end.

6. The fish-unloading apparatus defined in claim 4 wherein each of the holders is comprised of a pair of U-shaped and laterally open buckets, whereby a fish can be laid in each holder extending between the buckets thereof.

7. An apparatus for unloading fish from a hold of a boat adjacent an unloading site, the apparatus comprising:

a carriage movable horizontally at the site along the boat;

an articulated arm having a rigid inner section having an inner end pivoted about a horizontal inner axis on the carriage and an outer end, a pivot defining an outer horizontal axis at the inner-section outer end, and a rigid outer section having an inner end pivoted on the inner-section outer end at the pivot and an outer end;

means including an inner actuator braced between the carriage and the inner section for pivoting the arm on the carriage about the inner axis;

means including an outer actuator braced between the carriage and the outer arm section for pivoting the outer section about the outer axis on the inner section;

an endless conveyor element extending along the arm from the inner-section inner end to the outer-section outer end and having a carry stretch on one side of the sections and a return stretch on an opposite side of the sections;

a multiplicity of holders spaced along the conveyor element and each including a pair of separate laterally spaced buckets defining a central gap; and support wheels on the arm engaging the conveyor element in the gap between the buckets.

8. The fish-unloading apparatus defined in claim 7 wherein the sections are of generally the same length, whereby the pivot is central in the arm.

9. The fish-unloading apparatus defined in claim 7 wherein the actuators are hydraulic cylinders.

10. The fish-unloading apparatus defined in claim 7 wherein the means for pivoting the arm about the inner axis includes a knee lever having an outer link with an outer end pivoted on the inner section adjacent its outer end and an inner end, and an inner link having an inner end pivoted on the carriage and an outer end pivoted on the outer-link inner end;

the inner actuator being braced between the carriage and the inner link intermediate the inner-link ends.

11. The fish-unloading apparatus defined in claim 7 wherein each of the buckets is U-shaped and laterally open, whereby a fish can be laid in each holder extending between the buckets thereof.

* * * * *